United States Patent
Stamps et al.

(10) Patent No.: US 6,543,294 B2
(45) Date of Patent: Apr. 8, 2003

(54) SEALED PRESSURE INDICATOR

(75) Inventors: Frank Bradley Stamps, Colleyville, TX (US); Ronnie Lee Martin, Arlington, TX (US); James Lee Braswell, Jr., Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/737,924

(22) Filed: Dec. 15, 2000

(65) Prior Publication Data

US 2002/0073784 A1 Jun. 20, 2002

(51) Int. Cl.$^7$ .................................................. G01L 7/08
(52) U.S. Cl. .................... 73/729.1; 73/715; 73/716; 73/709
(58) Field of Search ................................. 73/729.1, 709, 73/707, 427, 715, 716; 116/200, 220, 70

(56) References Cited

U.S. PATENT DOCUMENTS

| 4,114,458 A | 9/1978 | Alinari ........................ 73/729 |
| 4,166,429 A | 9/1979 | Smorzaniuk ................ 116/202 |
| 4,203,385 A | 5/1980 | Mayer et al. ................ 116/270 |
| 4,335,283 A * | 6/1982 | Migrin ..................... 200/61.25 |
| 4,378,751 A * | 4/1983 | Lott et al. ..................... 116/271 |
| 5,027,740 A | 7/1991 | Kramer et al. ............. 116/34 R |
| 5,325,808 A | 7/1994 | Bernoudy, Jr. ............. 116/34 R |
| 5,935,084 A | 8/1999 | Southworth ................. 600/561 |

\* cited by examiner

Primary Examiner—Hezron Williams
Assistant Examiner—Corey D. Mack
(74) Attorney, Agent, or Firm—Pillsbury Winthrop LLP

(57) ABSTRACT

A pressure indicator according to the present invention monitors the pressure of the fluid in a vessel. One embodiment of the present invention comprises a closed pressurized gas volume behind a dimpled metal diaphragm. In normal operation, the force of the fluid pressure acting on the external surface of the diaphragm overcomes the force of the gas pressure acting on the internal surface of the diaphragm to hold the diaphragm in a concave geometry. In the event of a sufficient loss of fluid pressure, the force of the gas pressure acting on the internal surface of the diaphragm will overcome the force of the fluid pressure acting on the external surface of the diaphragm, thereby moving the diaphragm into a convex geometry. A viewing window disposed in the side of the vessel can be used to view the pressure indicator and determine the shape of the indicator diaphragm.

19 Claims, 2 Drawing Sheets

US 6,543,294 B2

SEALED PRESSURE INDICATOR

TECHNICAL FIELD OF THE INVENTION

The invention relates in general to the field of pressure measurement and in particular to a pressure indicator for use in a fluid-filled vibration isolator.

BACKGROUND OF THE INVENTION

It is very important in many fluid-based devices that the fluid volume and fluid pressure be maintained within the device. If a sufficient volume of fluid is lost from the device, or the device is for some other reason not sufficiently full, the operation of the device may be seriously impaired. Similarly, if sufficient pressure is not maintained within the device, certain devices may experience cavitation within the fluid, thereby impairing performance. It is, of course, intuitive that loss of fluid volume and loss of fluid pressure will often occur together. Accordingly, it is often advantageous to incorporate a pressure gauge into the design of such devices in order to monitor the condition of the device.

Significant effort has been directed, therefore, toward the design of effective devices for measuring the pressure in such fluid-based systems. These devices can also be used to determine whether the pressure within a vessel or fluid path is sufficient for proper operation of a mechanical device or system. Such pressure-measurement devices are also useful for determining whether the pressure in a vessel is within the acceptable mechanical limits of the vessel.

One known design for measuring pressure in a vessel is built around a sealed elastomeric diaphragm. The diaphragm is exposed to the fluid pressure on one side, and a reference pressure on the opposite side. With this device, the pressure in the vessel can be determined from the displacement of the diaphragm. In the most common design of this type, the reference pressure employed is atmospheric air pressure. In designs intended for measurement of higher pressures, the force of the pressure on the diaphragm is opposed by a spring.

A second known design uses a piston and cylinder apparatus in place of the diaphragm described above. In this design, the outside edge of the piston is sealed with an o-ring. As with the above-described design, the force of the fluid pressure may be opposed by a spring acting on the piston.

Pressure gauges and transducers traditionally employed for pressure measurement incorporate several limitations that make them poorly suited for use with certain devices. First, traditional commercially available pressure transducers incorporate organic membranes to contain the fluid against pressure. Although these types of membranes are suitable for containing certain types of fluids, certain other types of fluids, particularly fluorocarbon based fluids, can diffuse through these membranes at an unacceptable rate. Second, for the same reason that organic membranes are problematic, traditional methods of sealing pressure lines, such as organic O-rings and gaskets, may be unacceptable options. Third, even without respect to diffusion concerns, it is known that every pressure seal added to a design is an additional failure mode for the device, reducing the reliability of the device as a whole.

SUMMARY OF THE INVENTION

The present invention disclosed herein comprises an improved pressure indicator designed to overcome many of the shortcomings inherent in prior designs. First, the design makes use of a metal diaphragm in place of the organic diaphragm found in traditional designs. Second, in at least one embodiment the case of the pressure indicator of the present invention is hermetically sealed, thereby eliminating any concern regarding diffusion through or leakage around o-rings or gaskets. Third, certain embodiments of the pressure device of the present invention are contained completely within the body of the pressure vessel, so that there are no additional pressure connections to increase the potential for failure of the device.

A pressure indicator according to the present invention is designed to be used to monitor the pressure of the fluid in a vessel. One embodiment of the present invention comprises a sealed housing having at least one flexible surface and a spring disposed to act against the flexible surface and having a spring rate such that the flexible surface will be deflected in a convex manner whenever the pressure external to the indicator falls below a selected level. A second embodiment comprises a sealed bellows having at least one closed end and a spring disposed to act against the closed end of the bellows such that the length of the bellows will increase as the pressure external to the indicator decreases.

One embodiment of the present invention comprises a closed pressurized gas volume behind a dimpled metal diaphragm. In normal operation, the force of the fluid pressure acting on the external surface of the diaphragm overcomes the force of the gas pressure acting on the internal surface of the diaphragm to hold the diaphragm in a concave geometry. In the event of a sufficient loss of fluid pressure, the force of the gas pressure acting on the internal surface of the diaphragm will overcome the force of the fluid pressure acting on the external surface of the diaphragm, thereby moving the diaphragm into a convex geometry. In certain embodiments, a viewing window disposed in the side of the vessel can be used to view the pressure indicator and determine whether the indicator diaphragm is disposed in a concave or convex shape.

In certain embodiments of the present invention, a pressure indicator as disclosed herein is incorporated into the design of a liquid inertia vibration isolator in order to indicate pressure changes within the isolator. A pressure indicator of the present invention is particularly useful in this context as fluids commonly used in such vibration isolators are known to permeate through elastomers and polymers traditionally used in pressure indicating devices.

The present invention overcomes many limitations present in prior devices. The metal diaphragm used in place of the organic diaphragm found in traditional designs overcomes any concern for diffusion through the diaphragm. Hermetically sealed embodiments of the present invention eliminate any concern regarding diffusion through or leakage around o-rings or gaskets. Finally, those embodiments contained completely within the body of the pressure vessel eliminate any possibility of fluid loss from the device through the pressure indicator.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
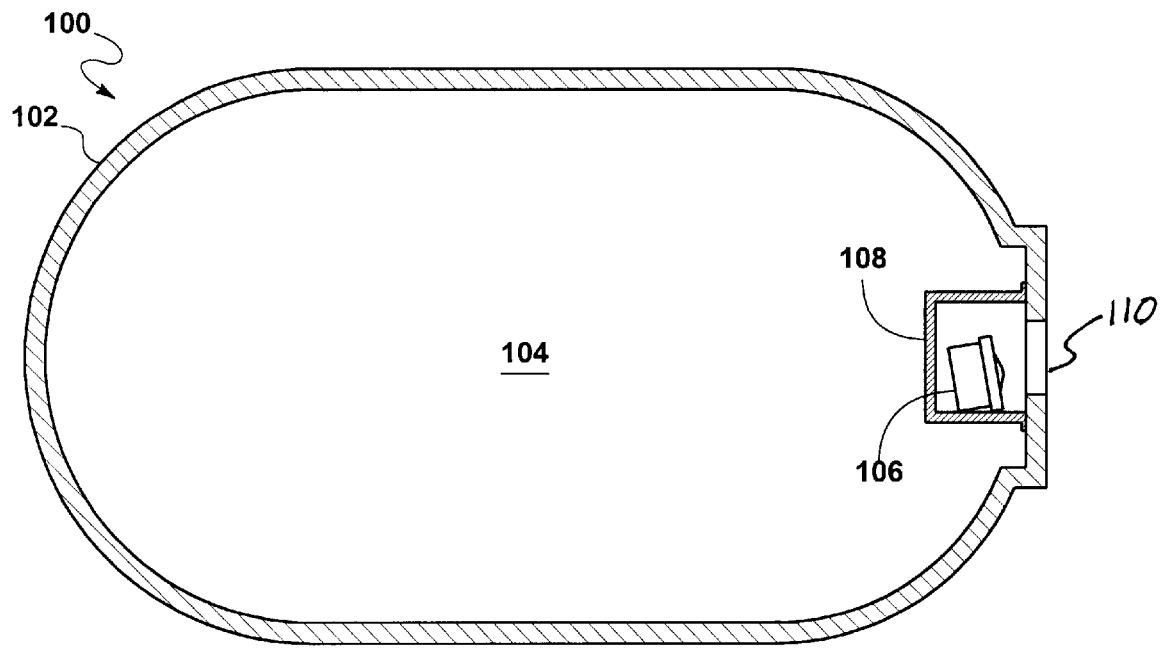
FIG. 1 is a cross sectional view showing a pressure vessel containing one embodiment of the present invention.

A pressure vessel assembly of the type generally used in combination with the present invention is shown in FIG. 1 and generally designated 100. Assembly 100 comprises vessel 102 having an inner volume 104 containing a fluid, which could be either a gas or liquid. A pressure indicator 106 is disposed at one end of vessel 102 and held captive in a retaining cage 108. Retaining cage 108 holds pressure indicator 106 in a location and orientation suitable for viewing through viewing window 110.

Pressure indicator 106 is designed to be used to monitor the pressure of the fluid in the vessel 102. One embodiment of pressure indicator 106 comprises a closed pressurized gas volume behind a dimpled metal diaphragm. In normal operation, the force of the fluid pressure acting on the external surface of the diaphragm overcomes the force of the gas pressure acting on the internal surface of the diaphragm to hold the diaphragm in a concave geometry. In the event of a sufficient loss of fluid pressure within vessel 102, the force of the gas pressure acting on the internal surface of the diaphragm will overcome the force of the fluid pressure acting on the external surface of the diaphragm, thereby moving the diaphragm into a convex geometry. In certain embodiments, the design of pressure indicator 106 is such that the shape and position of the diaphragm is clearly visible through viewing window 110. In certain embodiments, for example, the surface of the diaphragm may be coated with a bright paint or other indicia.

Many variations on the above-described design are possible without departing from the nature and scope of the present invention. For example, although the embodiment shown in FIG. 1 incorporates a viewing window 110 to allow the pressure indicator 106 to be viewed at any time, other embodiments could relay the status of the pressure within the vessel 102 to a receiver using non-visual means. Such means may include, but are not limited to, electronic or auditory communication methods.

Additionally, although the pressure indicator 106 shown in FIG. 1 is shown as being used in combination with a static vessel 102, nothing within the spirit and scope of the present invention limits various embodiments to this design. The present invention could be used equally well in a pipe, for example. Nothing within the scope of the present invention limits its use to those applications wherein the pressure indicator 106 is in constant communication with the fluid pressure being measured. The pressure indicator 106 could, for example, be disposed in a cavity having intermittent fluid communication with the inner volume 104.

Figure 2A:
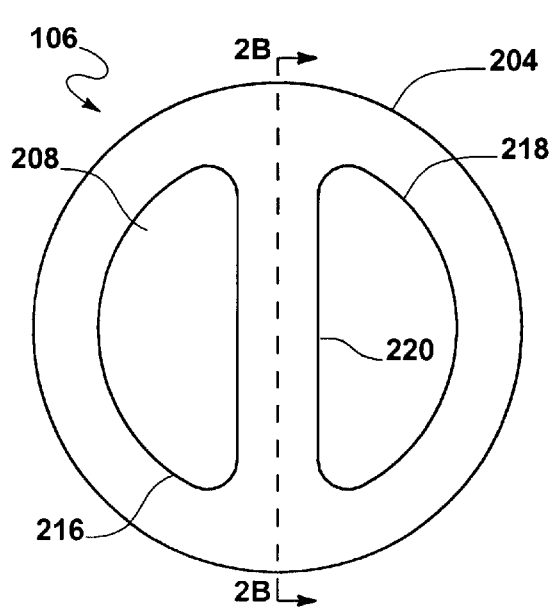
FIG. 2A is a frontal view showing a first embodiment of the present invention.
Figure 2B:
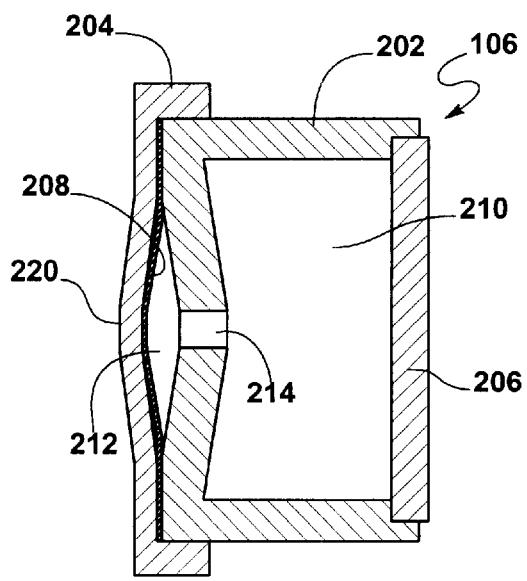
FIG. 2B is a cross sectional view showing a first embodiment of the present invention.

One embodiment of a pressure indicator 106 of FIG. 1 is shown in detail in FIGS. 2A and 2B. Pressure indicator 106 principally comprises indicator case 202, indicator front cover 204, indicator rear cover 206, and indicator diaphragm 208. Indicator case 202 and indicator rear cover 206 together define indicator rear internal cavity 210. Indicator case 202 and indicator diaphragm 208 together define indicator front Internal cavity 212. Indicator rear internal cavity 210 and indicator front internal cavity 212 are connected via communication passage 214. In the embodiment shown in FIGS. 2A and 2B, indicator diaphragm 208 is held against indicator case 202 by indicator front cover 204. Fluid pressure in a vessel such as vessel 102 impinges on indicator diaphragm 208 through fluid windows 216 and 218. Indicator internal cavities 210 (rear) and 212 (front) are sealed from the surrounding fluid. In certain embodiments, indicator internal cavities 210 (rear) and 212 (front) are hermetically sealed.

As shown in FIG. 2B, indicator diaphragm 208 of pressure indicator 106 is shown in its extended state, in which it is forced against witness strap 220 by the internal pressure of pressure indicator 106. This is the state in which the indicator diaphragm 208 will be disposed when the internal pressure of pressure indicator 106 exceeds the pressure external to pressure indicator 106. In other words, pressure indicator 106 as shown in FIGS. 2A and 2B is indicating a low-pressure condition In the event that the pressure external to pressure indicator 106 exceeds the internal pressure of pressure indicator 106, the pressure acting on the external surface of indicator diaphragm 208 will force indicator diaphragm 208 into a concave geometry, in which it conforms to the front surface of indicator case 202.

Figure 3:
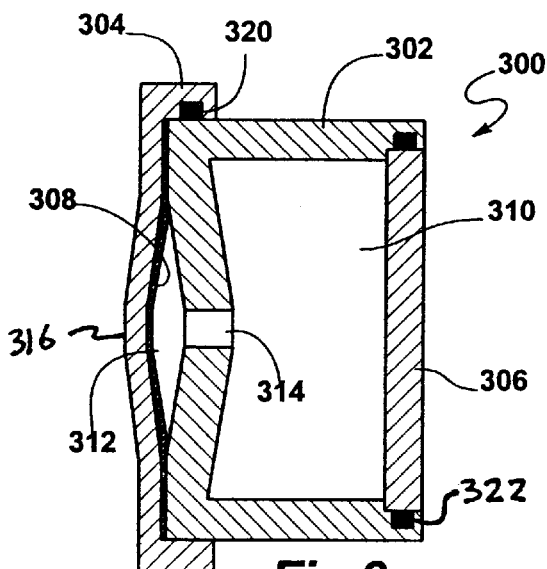
FIG. 3 is a cross sectional view showing a second embodiment of the present invention.

A second embodiment of a pressure indicator according to the present invention is shown in detail in FIG. 3 and generally designated 300. Pressure indicator 300 principally comprises indicator case 302, indicator front cover 304, indicator rear cover 306, and indicator diaphragm 308. Indicator case 302 and indicator rear cover 306 together define indicator rear internal cavity 310. Indicator case 302 and indicator diaphragm 308 together define indicator front internal cavity 312. Indicator rear internal cavity 310 and indicator front internal cavity 312 are connected via communication passage 314. In the embodiment shown in FIG. 3, indicator diaphragm 308 is held against indicator case 302 by indicator front cover 304. Fluid pressure in a vessel such as vessel 102 impinges on indicator diaphragm 308 through fluid windows (not shown) in the indicator front cover 304.

Pressure indicator 300 is a particular embodiment of the present invention in which sealing between the internal cavities 310 (rear) and 312 (front) and the surrounding fluid is accomplished through the use of glanded o-rings 320 and 322. Other embodiments may use a variety of other sealing methods, including metal or polymeric gaskets, mating threaded surfaces, soldering, brazing, adhesive, or any of the variety of fluid sealing methods commonly employed in the art of fluid sealing without departing from the spirit and scope of the present invention.

In the embodiment shown in FIG. 3, indicator diaphragm 308 of indicator 300 is shown in its extended state, in which it is forced against the indicator witness strap 316 by the internal pressure of indicator 300. This is the state in which the indicator diaphragm 308 will be disposed when the internal pressure of indicator 300 exceeds the pressure external to indicator 300. In other words, indicator 300 as shown in FIG. 3 is indicating a low-pressure condition. In the event that the pressure external to indicator 300 exceeds the internal pressure of indicator 300, the pressure acting on the external surface of indicator diaphragm 308 will force indicator diaphragm 308 into a concave geometry, in which it will conform to the front of indicator case 302.

Figure 4:
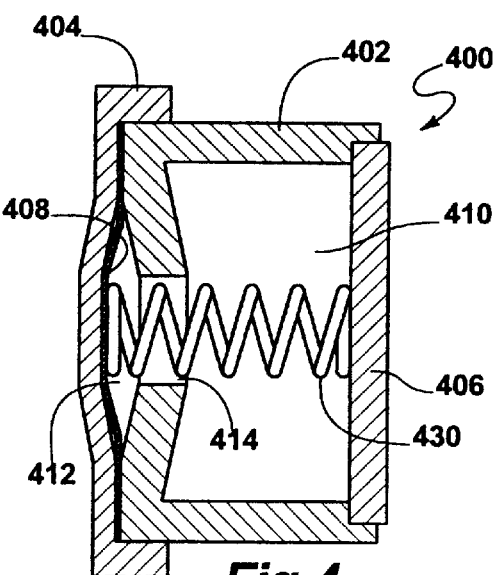
FIG. 4 is a cross sectional view showing a third embodiment of the present invention.

A third embodiment of a pressure indicator according to the present invention is shown in detail in FIG. 4 and generally designated 400. Pressure indicator 400 principally comprises indicator case 402, indicator front cover 404, indicator rear cover 406, and indicator diaphragm 408. Indicator case 402 and indicator rear cover 406 together define indicator rear internal cavity 410. Indicator case 402 and indicator diaphragm 408 together define indicator front internal cavity 412. Indicator rear internal cavity 410 and indicator front internal cavity 412 are connected via communication passage 414. In the embodiment shown in FIG. 4, indicator diaphragm 408 is held against indicator case 402 by indicator front cover 404. Fluid pressure in a vessel such as vessel 102 impinges on indicator diaphragm 408 through fluid windows (not shown) in the front cover 404.

Pressure indicator 400 additionally comprises coil spring 430 acting on the back surface of indicator diaphragm 408. With this design, the internal pressure within pressure indicator 400 can be reduced as compared to designs not incorporating such a spring.

Figure 5:
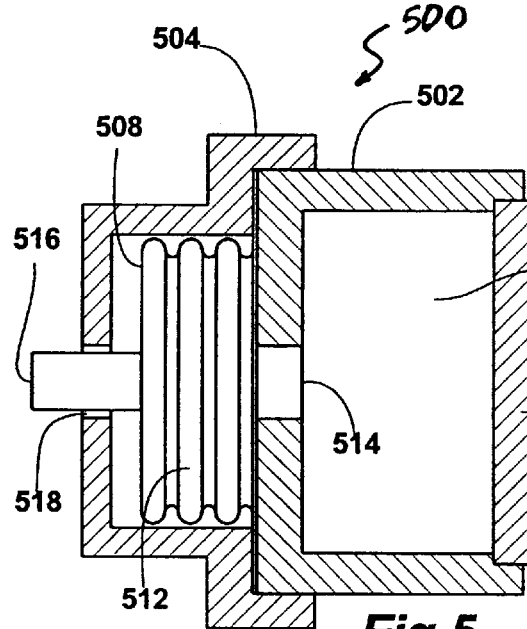
FIG. 5 is a cross sectional view showing a fourth embodiment of the present invention.

A fourth embodiment of a pressure indicator according to the present invention is shown in detail in FIG. 5 and generally designated 500. Pressure indicator 500 principally comprises indicator case 502, indicator front cover 504, indicator rear cover 506, and indicator bellows 508. Indicator case 502 and indicator rear cover 506 together define rear internal cavity 510. Indicator case 502 and indicator bellows 508 together define indicator front internal cavity 512. Indicator rear internal cavity 510 and indicator front internal cavity 512 are connected via communication passage 514. In the embodiment shown in FIG. 5, indicator bellows 508 is held against indicator case 502 by indicator front cover 504. Fluid pressure in a vessel such as vessel 102 impinges on indicator bellows 508 through fluid windows (not shown) in the front cover 504.

In the embodiment shown in FIG. 5, indicator bellows 508 of indicator 500 is shown in an intermediate state, approximately halfway between its highest and lowest pressure positions. Indicator bellows 508 can be constructed from any suitable material. In applications in which hermetic sealing of indicator 500 is required, indicator bellows 508 can be constructed from a metal such as stainless steel. Indicator bellows 508 allows indicator 500 to indicate a range of pressures, rather than being limited to a binary "high" or "low" condition. The pressure within the vessel can be ascertained by the position of the indicator plunger 516 passing through front port 518. When the indicator plunger 516 is recessed into front cover 504, this indicates a higher-pressure condition. Conversely, when the indicator plunger 516 is extended from front port 518 in indicator front cover 504, this indicates a lower pressure condition within the surrounding fluid. In certain embodiments, indicator plunger 516 may be marked with numbered divisions or color bands to assist in identification.

Figure 6:
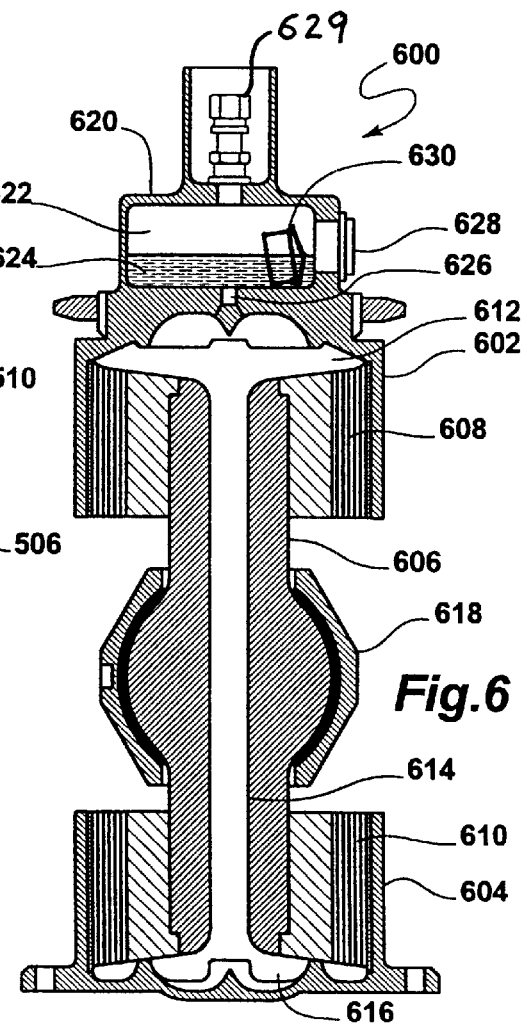
FIG. 6 is a cross sectional view of a vibration isolator incorporating one embodiment of the present invention.

FIG. 6 shows a pressure indicator in use as it might be incorporated into a mechanical device, in this case a vibration isolator, designated 600. Vibration isolator 600 comprises an upper housing 602 and a lower housing 604. In this embodiment, upper housing 602 and lower housing 604 are not directly mechanically connected, but are connected indirectly via the other components of the device.

In addition to upper and lower housings 602 and 604, isolator 600 further comprises an inner cylinder 606 disposed within the volume defined by the concave portions of upper and lower housings 602 and 604. In operation, inner cylinder 606 translates within this volume in reaction to motion imposed by a vibrating body.

Upper housing 602 is concentrically bonded to inner cylinder 606 by an elastomer tubeform bearing 608. Lower housing 604 is concentrically bonded to inner cylinder 606 by an elastomer tubeform bearing 610. The elastomer tubeform bearings 608 and 610 serve as compliant spring members for the vibration isolator 600. The length of the elastomer tubeform bearings 608 and 610 can vary according to the demands of a particular application, but the length must be sufficient to minimize elastomer bulging caused by oscillatory pressure in the device.

The concave inner surface of upper housing 602 and the upper surfaces of inner cylinder 606 and tubeform bearing 608 together define an upper fluid chamber 612. Upper fluid chamber 612 is connected to the lower portions of vibration isolator 600 via a tuning port 614 passing through inner cylinder 606. The concave inner surface of lower housing 604 and the lower surfaces of inner cylinder 606 and elastomer tubeform bearing 610 together define a lower fluid chamber 616, which is in fluid communication with the lower end of tuning port 614. In addition to serving as compliant spring members for the vibration isolator 600, elastomer tubeform bearings 608 and 610 serve as the fluid seals for fluid chambers 612 (upper) and 616 (lower).

The fluid chambers 612 (upper) and 616 (lower) and tuning port 614 are filled with an inviscid fluid 624 and pressurized to prevent cavitation. Vibration isolator 600 incorporates a central elastomer spherical bearing 618 in addition to the two elastomer tubeform bearings 608 and 610.

In operation, the upper and lower housings 602 and 604 are mounted to the body to be isolated from vibration. The spherical bearing 618 is connected to the vibrating body. As the inner cylinder 606 moves within the vibration isolator 600, the volume of one of fluid chambers 612 (upper) and 616 (lower) will increase as the other decreases. This change in volume creates a pressure differential between the fluid chambers 612 (upper) and 616 (lower) and a corresponding flow of the inviscid fluid 624 from one chamber to another, in the opposite direction of movement of the inner cylinder 606. This movement of inviscid fluid 624 causes an inertial force to be generated. Within a selected range of frequencies, this inertial force substantially or completely cancels out the elastomeric spring force in the vibration isolator 600.

In order to stabilize internal fluid pressures, fluid and elastomer thermal expansion is accommodated by an integral volume compensator 620. The integral volume compensator 620 alleviates the accumulation of excessive pressure and the risk of cavitation that would otherwise exist due to volume changes caused by operation of the vibration isolator 600 across a broad range of temperatures. In the vibration isolator 600 shown in FIG. 6, the integral volume compensator 620 takes the form of an air spring 622 filled with a gas such as nitrogen. In this design, the integral volume compensator 620 does not require a barrier between the air spring 622 and the inviscid fluid 624. Empirical data has shown that one embodiment of the present invention exhibits approximately +/−25% change in internal fluid pressure over a temperature range of −45 deg. F. to +150 deg. F. Accordingly, it is desirable that the pressure within the integral volume compensator 620 be set to at least 25% above the vapor pressure of the tuning fluid so as to avoid cavitation. The internal pressure is bounded at the high end by the mechanical stress limits of the isolator materials. The internal pressure within the integral volume compensator 620 can be monitored through the use of pressure indicator 630, which may comprise any of the embodiments disclosed in the present application. The embodiment shown in FIG. 6 incorporates a sight glass 628 for visually determining the level of fluid and pressure in the compensator 620 and a gas valve 629 for pressurizing the air spring 622 directly. In certain embodiments of the present invention, the inner surfaces of the vibration isolator 600 are shaped so as to allow bubbles to rise to the integral volume compensator 620 when the vibration isolator 600 is disposed in its normal orientation.

Vibration isolator 600 communicates fluid pressure to the integral volume compensator 620 via a small diameter orifice 626. The size of the small diameter orifice 626 is such that the pressure pulses caused by oscillation of the inner cylinder 606 do not pass into the integral volume compensator 620 in any significant degree. With this design, the small diameter orifice 626 acts as a fluid pressure filter, transmitting static pressure changes into the integral volume compensator 620 while at the same time blocking pressure oscillations. The ideal diameter for the small diameter orifice 626 will vary with the viscosity of the fluid. One embodiment of the present invention incorporates a small diameter orifice 626 having a diameter of approximately 0.050".

Damping within vibration isolator 600 is minimized through the use of elastomer tubeform bearings 608 and 610 having low damping characteristics and through the use of an inviscid fluid 624 within the device. Damping is additionally minimized through the use of a tuning port 614 having a relatively large value. A large diameter tuning port 614 reduces damping in the vibration isolator 600 by minimizing the velocity of inviscid fluid 624 within the tuning port 614.

The inviscid fluid 624 used may vary from one embodiment to another, but it is desirable that the inviscid fluid 624 have a low viscosity and be noncorrosive. For example, inviscid fluid 624 of vibration isolator 600 may be SPF I manufactured by LORD CORPORATION®. Other embodiments may incorporate mercury or hydraulic fluid having dense particulate matter suspended therein. Additionally, the mass of the fluid may in some embodiments be supplemented by the use of a solid slug disposed in the tuning port 614.

Similarly, the elastomer used for the elastomer tubeform bearings 608 and 610 can vary, but it is desirable that the elastomer have a long fatigue life and exhibit low damping characteristics. For example, the elastomer may be LORD SPE X® elastomer manufactured by LORD CORPORATION®.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A fluid vessel comprising:
   a vessel body
      having
         an inner surface and
         an outer surface;
   an inner volume
      defined by the inner surface of the vessel body containing a fluid having a fluid pressure;
   a pressure indicator, disposed completely within the inner volume, having
      a sealed housing,
      an internal indicator pressure within the sealed housing, and
      at least one flexible diaphragm,
         the diaphragm having
            an interior surface exposed to the indicator pressure and
            an exterior surface exposed to the fluid pressure,
         such that the indicator pressure and instant fluid pressure effect movement of the flexible diaphragm in a visibly-discernable manner according to the instant fluid pressure; and
   a transparent viewing window,
      disposed in the vessel body
      having
         an inner surface
            exposed to the fluid pressure, and
      positioned
         along a line of sight
            from the exterior of the fluid vessel to the pressure indicator.

2. The fluid vessel of claim 1 further comprising a mechanical spring acting on the diaphragm.

3. The fluid vessel of claim 1 wherein the flexible diaphragm is disposed between an inner limiting surface and an outer limiting surface.

4. The fluid vessel of claim 1 wherein the pressure indicator is made entirely of one or more metal alloys.

5. The fluid vessel of claim 1 wherein the sealed housing is hermetically sealed.

6. The fluid vessel of claim 1 wherein the flexible diaphragm is dimpled.

7. The fluid vessel of claim 1 wherein the flexible diaphragm has a visual indicator thereon to aid viewability.

8. A fluid vessel comprising:
   a vessel body
      having
         an inner surface and an outer surface;
   an inner volume
      defined by the inner surface of the vessel body containing a fluid having a fluid pressure;
   a sealed pressure indicator, disposed completely within the inner volume and having an internal indicator pressure and a bellows having:
      a closed end,
      an interior surface exposed to the internal indicator pressure, and
      an exterior surface exposed to the fluid pressure;
      such that the length of the bellows will increase as a pressure external to the pressure indicator decreases; and
   a visual indicator directly connected to the bellows and having surface indicia to assist in identification of the instant fluid pressure based on the degree of extension of the sealed bellows; and a transparent viewing window,
   disposed in the vessel body
   having
      an inner surface
         exposed to the fluid pressure, and
      positioned
         along a line of sight
            from the exterior of the fluid vessel to the visual indicator.

9. The fluid vessel of claim 8 further comprising a mechanical spring acting on the diaphragm.

10. The fluid vessel of claim 8 wherein the movement of the bellows is restricted by an outer limiting surface.

11. The fluid vessel of claim 8 wherein the pressure indicator is made entirely of one or more metal alloys.

12. The fluid vessel of claim 8 wherein the bellows is hermetically sealed.

13. The fluid vessel of claim 8 wherein the bellows is made of stainless steel.

14. A vibration isolator for connecting a first body and a second body, comprising:
a housing having an inner surface defining a fluid volume;
a tuning fluid disposed in the fluid volume;
a piston disposed in the fluid volume and having a surface disposed to substantially segregate a portion of the fluid volume, the segregated portion defining a first chamber within the fluid volume;
a second chamber having a variable volume;
a passage connecting the first chamber to the second chamber and permitting fluid flow from the first chamber to the second chamber;
a volume compensator in fluid communication with the fluid volume in such a manner as to maintain a substantially constant static pressure within the first and second chambers; and a pressure indicator, disposed within the volume compensator, comprising a sealed housing having an internal pressure and at least one flexible diaphragm, the diaphragm having an interior surface exposed to the internal pressure and an exterior surface exposed to a pressure external to the pressure indicator such that the internal pressure and the external pressure effect movement of the flexible diaphragm in a visibly-discernable manner according to the instant fluid pressure;
a transparent viewing window,
   disposed in the sealed housing of the volume compensator,
   having
      an inner surface
         exposed to the static pressure
            within the volume compensator, and
      positioned
         along a line of sight
            from the exterior of the volume compensator
               to the pressure indicator.

15. The vibration isolator of claim 14 further comprising a mechanical spring connected to the flexible diaphragm.

16. The vibration isolator of claim 14 wherein the flexible diaphragm is disposed between an inner limiting surface and an outer limiting surface.

17. The vibration isolator of claim 14 wherein the indicator is made entirely of one or more metal alloys.

18. The vibrator isolator of claim 14 wherein the sealed housing of the pressure indicator housing is hermetically sealed.

19. The vibration isolator of claim 14 wherein the flexible diaphragm is dimpled.

* * * * *